United States Patent [19]

Jessop

[11] Patent Number: 4,961,115

[45] Date of Patent: Oct. 2, 1990

[54] LENS ADJUSTMENT APPARATUS

[75] Inventor: Thomas C. Jessop, Webster, N.Y.

[73] Assignee: Eastman Kodak Company, Rochester, N.Y.

[21] Appl. No.: 292,687

[22] Filed: Jan. 3, 1989

[51] Int. Cl.⁵ .............................................. H04N 3/14
[52] U.S. Cl. ...................................... 358/229; 354/286
[58] Field of Search .......................... 358/225, 229, 98; 354/286

[56] References Cited

U.S. PATENT DOCUMENTS

| | | | |
|---|---|---|---|
| 3,407,018 | 10/1968 | Miller | 350/321 |
| 3,428,915 | 2/1969 | Leone et al. | 331/94.5 |
| 3,704,658 | 12/1972 | Uesugi | 354/286 |
| 3,758,198 | 9/1973 | Kanie et al. | 354/286 |
| 4,733,945 | 3/1988 | Bacich | 354/286 |
| 4,769,711 | 9/1988 | Date | 358/229 |
| 4,803,557 | 2/1989 | Bridges | 358/229 |

Primary Examiner—Stephen Brinich
Attorney, Agent, or Firm—Roger A. Fields

[57] ABSTRACT

A lens assembly is connected to a housing containing an image sensor by a flexure means which provides for universal flexure of the lens assembly relative to the housing. A pair of compound screws rigidly couple the lens assembly to the housing and are rotatable to displace the lens assembly relative to the housing on said flexure means.

10 Claims, 3 Drawing Sheets

LENS ADJUSTMENT APPARATUS

BACKGROUND OF THE INVENTION

1. Cross Reference to Related Applications

Reference is made to the following commonly assigned copending applications:

1. U.S. Pat. No. 4,809,064, entitled ENLARGING PHOTOGRAPHIC PRINTER, issued Feb. 28, 1989, in the names of Shaun M. Amos, Richard J. Backus and Thomas C. Jessop.
2. U.S. Pat. No. 4,821,073, entitled METHOD AND APPARATUS FOR MEASURING CHARACTERISTICS OF PHOTOGRAPHIC NEGATIVES, issued Apr. 11, 1989 in the names of Patrick A. Cosgrove and Richard J. Backus.
3. U.S. Ser. No. 246,575, entitled LENS FOCUS ADJUSTMENT MEANS, filed Sept. 19, 1988 in the name of Thomas C. Jessop.
4. U.S. Pat. No. 4,893,927, entitled METHOD AND APPARATUS FOR ALIGNING A ZOOM LENS WITH AN IMAGE SENSOR, Jan. 16, 1990 in the name of Martin L. Miller.

2. Field of the Invention

This invention relates to adjustment apparatus and more specifically to apparatus for adjusting a lens realtive to an image sensing device in a video camera.

3. Description of the Prior Art

In a video camera empoying a solid state image sensor and a zoom lens, it is important to have the optical center of the zoom lens line up with the optical center of the sensor. If there is error in alignment, the image will wander on the video screen when the user changes the magnification of the zoom lens while composing. Wander of the image produces composition error. Such errors are not significant in video cameras used for recording moving scenes since the user simply aims the camera to compensate for zoom induced scene shifts. However, in the case of precision systems for making enlargements from prints of the type disclosed in commonly assigned copending applications Ser. Nos. 122,995 and 122,996, such misalignments can result in prints that do not correspond with images that appeared on the monitor during composition of the images.

SUMMARY OF THE INVENTION

It is an object of the present invention to provide a simple and reliable device for aligning the optical centers of two devices.

Another object of the invention is to provide a simple low-cost universal joint.

In the disclosed embodiment of the invention, a lens assembly is connected to a housing containing an image sensor by a flexure means providing for universal flexure of the lens assembly relative to the housing. A pair of compound screws rigidly couple the lens assembly to the housing and are rotatable to displace the lens assembly relative to the housing on said flexure means.

BRIEF DESCRIPTION OF THE DRAWINGS

Other objects and advantages of the invention will become apparent from the following description taken in connection with the accompanying drawings wherein.

DETAILED DESCRIPTION OF THE INVENTION

Figure 1:
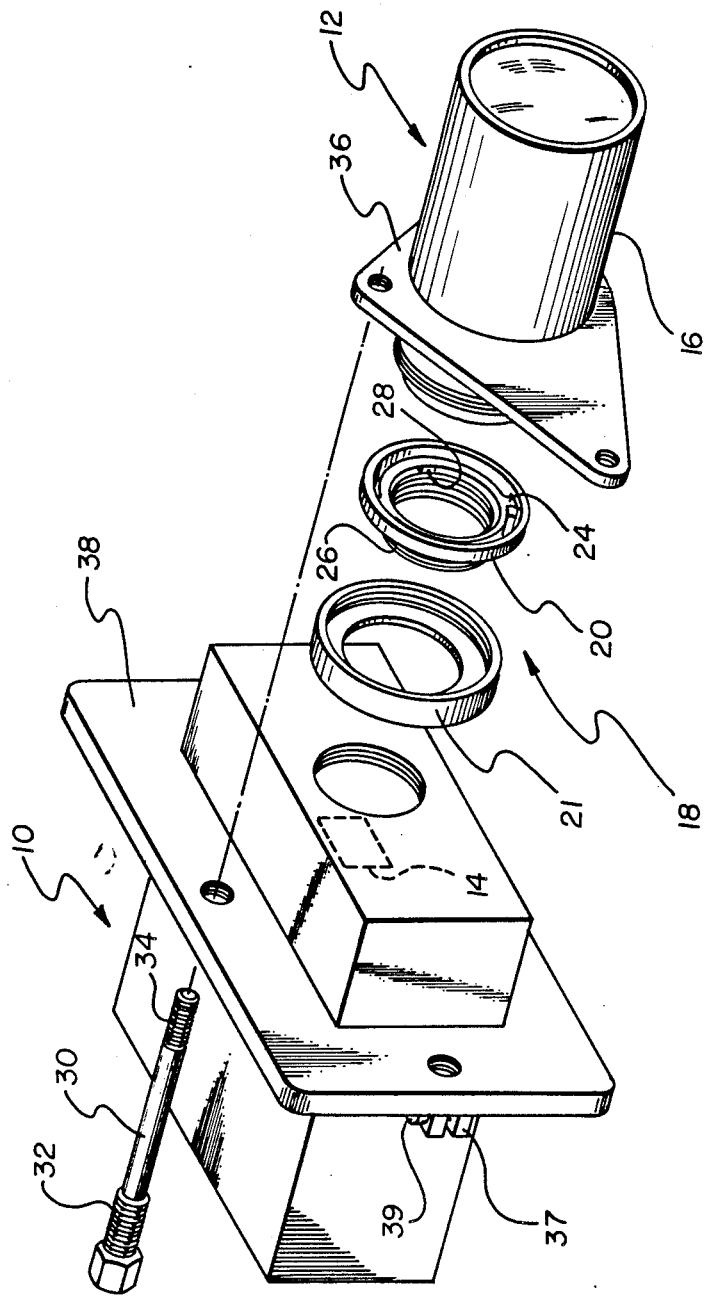
FIG. 1 is an exploded perspective view of a video camera incorporating an alignment means in accordance with the invention.
Figure 2:
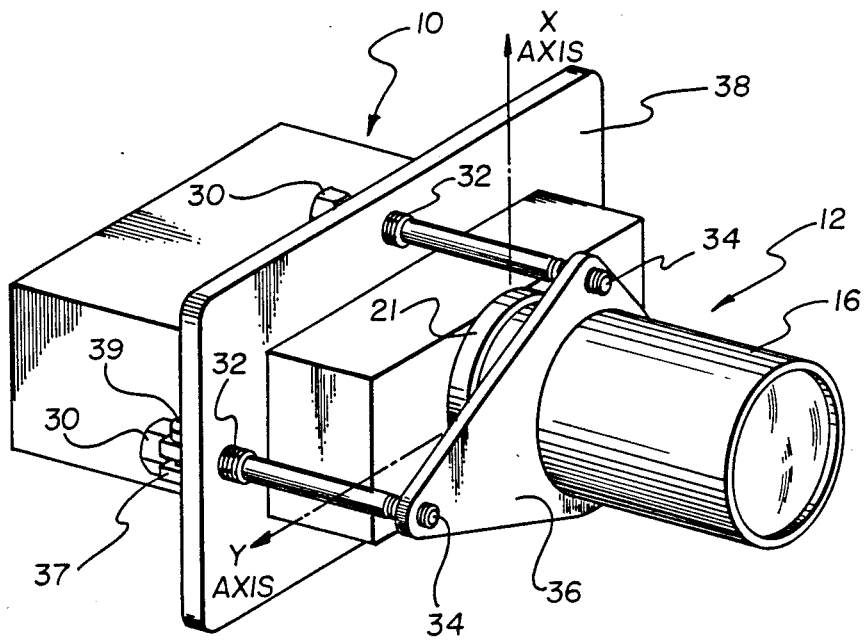
FIG. 2 is a perspective view of the apparatus shown in FIG. 1 assembled.
Figure 3:
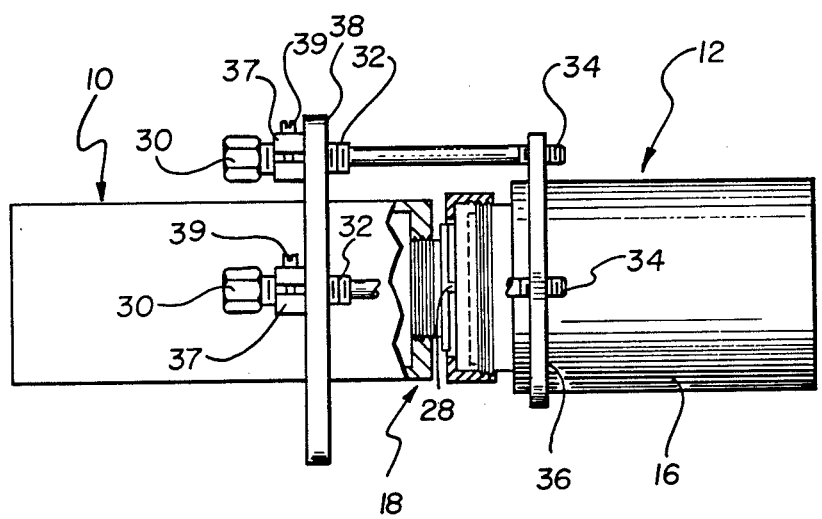
FIG. 3 is a side view of the apparatus shown in FIGS. 1 and 2 in partial section.

Referring to the drawings and initially to FIGS. 1 and 2, there is shown a video camera 10 having a zoom lens assembly 12 for producing an image on a charge coupled device (CCD) 14. As discussed above, it is important that the optical axis of the lens assembly be aligned with the optical center of the CCD 14 to prevent misalignment during zooming. Such an alignment procedure is disclosed and claimed in commonly assigned U.S. Pat. No. 4,893,927 entitled METHOD AND APPARATUS FOR ALIGNING A ZOOM LENS WITH AN IMAGE SENSOR, issued in the name of Martin L. Miller. The disclosure of that application is incorporated herein by reference.

The lens assembly 12 comprises a typical zoom lens having a lens barrel 16 containing a plurality of lens elements and having a part axially or rotatably movable to vary the magnification of the image composed on CCD 14. Such lens assemblies are well known in, the art and further description is deemed unnecessary.

Figure 4:
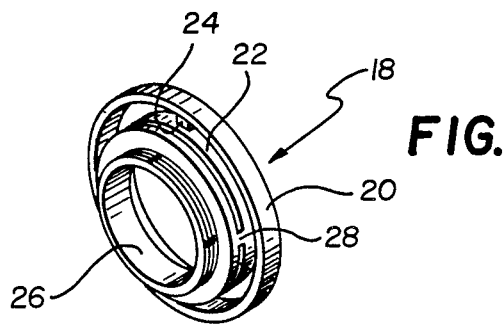
FIG. 4 is a perspective view of the universal coupling joint shown in FIGS. 1 and 2.
Figure 5:
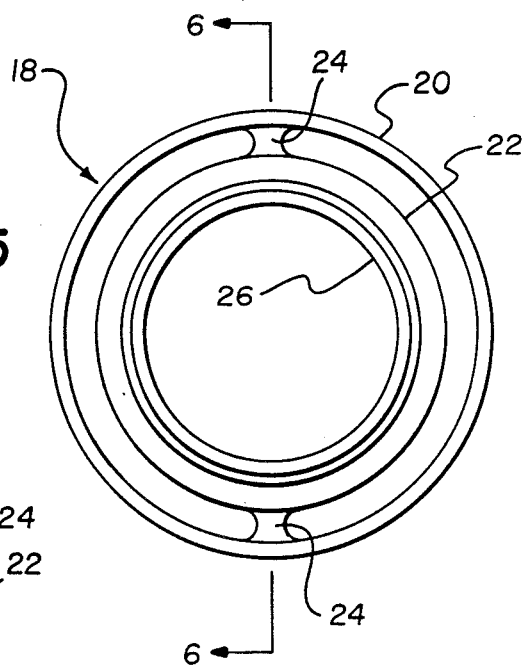
FIG. 5 is an end view of the apparatus shown in FIG. 4.
Figure 6:
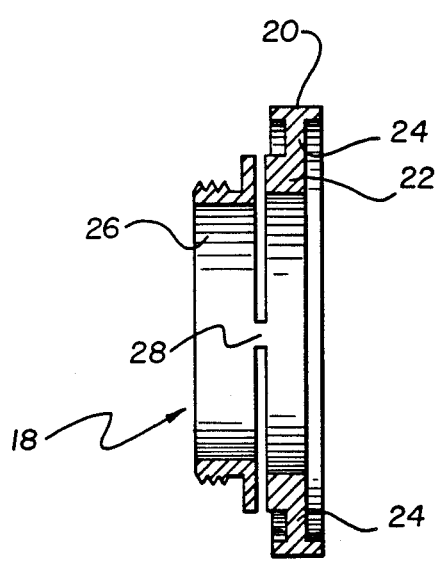
FIG. 6 is a section taken along the line 6—6 of FIG. 5.

In accordance with the invention, a flexure means comprising a universal joint 18 is mounted between the camera 10 and lens assembly. The joint 18 shown in detail in FIGS. 4, 5 and 6 comprises a first cylindrical ring portion 20 which is received in a recess in the end of the lens barrel 16 and rigidly retained therein by a cylindrical cap 21 threaded on the end of the lens barrel 16. The joint 18 includes an integral second ring portion 22 extending coaxially from portion 20 and connected to portion 20 by two integral diametrically opposite tabs 24. The tabs 24 have sufficient flexibility to permit pivotal movement of the second ring portion 22 relative to portion 20 about an X-axis extending through the tabs 24.

The joint 18 further comprises a third ring portion 26 formed integrally with portions 20 and 22 and extending coaxially from portion 22. The ring portion 26 is provided with external threads and is threaded into an opening in the end of camera 10. In the disclosed embodiment, ring portion 26 is formed as an integral extension of ring portion 22 and connected thereto by diametrically opposite flexible tabs 28 formed by removing material from the periphery of the joint assembly. The tabs 28 define a Y-axis angularly spaced approximately 90 degrees from tabs 24 and have sufficient flexibility to permit pivotal movement of the ring portion 26 relative to ring portion 22 about the Y-axis. The tabs 24 and 28 thus effectively provide for a universal movement of ring portion 26 relative to ring portion 20.

To provide for adjustment of the lens assembly 12 relative to the camera 10, the lens assembly 12 and camera 10 are coupled by a pair of compound screws 30. Each screw 30 has two threaded portions 32 and 34 differing in pitch by a predetermined amount. The portion 34 of each screw is threaded into a flange 36 of the lens assembly 12 and the portion 32 of each screw is threaded received by a clamp 37 housing clamping screw 39 attached to a flange 38 of the camera 10. The screws 30 thus provide a rigid coupling of the lens assembly to the camera and effectively support the lens assembly on the camera.

The screws 30 are preferably radially spaced 90 degrees apart on a circle coaxial with the optical axis of the lens assembly 12. The angular position of the screws is not critical. They can be located anywhere as long as they are positioned approximately 90 degrees apart and so that rotation of one screw produces motion of the optical axis of the lens assembly horizontally across the CCD and the other produces motion of the optical axis vertically across the CCD.

In operation, rotation of the screws 30 will produce displacement of the lens assembly 12 relative to the camera 10 through flexure of tabs 24 and 28. The location of the tabs at 90 degrees relative to each other provide for X and Y displacement components with a universal joint type of action. The location of the screws 30 substantially 90 degrees relative to each other produce adjusting force components also at substantially 90 degrees orientation relative to each other. The threaded portions 32 and 34 of different pitch cause each screw rotation to produce a displacement corresponding to the difference in Pitch of the two portions. Thus, rotation of the screws result in very precision micro-adjustments of the lens assembly. While various pitch combinations will provide adequate results, a pitch of 28 threads Per inch in portion 32 and a pitch of 32 threads per inch in portion 34 produces desired precision in the adjustments.

After the necessary adjustments have been effected, screws 30 can be clamped to retain the alignment by tightening screws 39.

It will thus be apparent that the invention provides for simple precision adjustment of a lens assembly relative to the image sensor of a video camera.

While the invention has been particularly shown and described with reference to a preferred embodiment thereof, it will be understood by those skilled in the art that various changes may be made without departing from the scope of the invention as defined by the appended claims.

I claim:

1. Apparatus for adjustably supporting a lens assembly on the housing of a camera containing an image sensor, comprising:
   flexure means positioned between the lens assembly and housing for permitting universal displacement of the lens assembly relative to the housing; and
   a pair of compound screws each having two threaded portions of different pitch, one portion of each screw being threaded in said housing and the other portion being threaded in said lens assembly, said screws being angularly spaced relative to the optical axis of said lens assembly to provide for displacement of the lens assembly relative to the camera by said flexure means.

2. Apparatus as claimed in claim 1 wherein said flexure means comprises:
   a first ring member attached to said lens assembly;
   a second ring member;
   first yieldable means connecting said second ring to said first ring member to permit movement of said first ring member relative to said second ring in a first direction;
   a third ring member attached to said camera; and
   second yieldable means connecting said second ring member to said third ring member to permit movement of said second ring member relative to said third ring member in a second direction.

3. Apparatus as claimed in claim 2 wherein said first and second yieldable means each comprise a pair of diametrically opposite flexible tabs extending between the rings they connect.

4. Apparatus as claimed in claim 3 wherein said ring members and said tabs are integrally formed as a single unitary structure.

5. Apparatus for adjustably supporting a lens assembly on the housing of a camera comprising:
   flexure means positioned between the lens assembly and housing for permitting universal displacement of the lens assembly relative to the housing;
   a first ring member attached to said lens assembly;
   a second ring member;
   first yieldable means connecting said second ring to said first ring member to permit movement of said first ring member relative to said second ring in a first direction;
   a third ring member attached to said camera; and
   second yieldable means connecting said second ring member to said third ring member to permit movement of said second ring member relative to said third ring member in a second direction.

6. Apparatus as claimed in claim 5 further including a pair of screws threaded received by said housing and said lens assembly rotatable to effect such universal displacement.

7. Apparatus for supporting an optical assembly on a housing, said apparatus comprising:
   flexure means positioned between the optical assembly and the housing for permitting universal displacement of the optical assembly relative to the housing; and
   a pair of compound screws each having two threaded portions of different pitch, one portion of each screw being threaded in the housing and the other portion being threaded in the optical assembly, said screws being angularly spaced relative to an optical axis of the optical assembly to provide for displacement of the optical assembly relative to the housing by said flexure means.

8. Apparatus as claimed in claim 7 wherein said flexure means comprises:
   a first ring member attached to the optical assembly;
   a second ring member;
   first yieldable means connecting said second ring to said first ring member to permit movement of said first ring member relative to said second ring in a first direction;
   a third ring member attached to the housing; and
   second yieldable means connecting said second ring member to said third ring member to permit movement of said second ring member relative to said third ring member in a second direction.

9. Apparatus as claimed in claim 8 wherein said first and second yieldable means each comprise a pair of diametrically opposite flexible tabs extending between the rings they connect.

10. Apparatus as claimed in claim 9 wherein said ring members and said tabs are integrally formed as a single unitary structure.

* * * * *